(12) United States Patent
Oishi et al.

(10) Patent No.: US 12,399,413 B2
(45) Date of Patent: Aug. 26, 2025

(54) OPTICAL WAVEGUIDE ELEMENT AND OPTICAL MODULATOR

(71) Applicant: SUMITOMO OSAKA CEMENT CO., LTD., Tokyo (JP)

(72) Inventors: Kenta Oishi, Tokyo (JP); Yu Kataoka, Tokyo (JP); Shingo Takano, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 301 days.

(21) Appl. No.: 18/246,358

(22) PCT Filed: Sep. 28, 2021

(86) PCT No.: PCT/JP2021/035616
§ 371 (c)(1),
(2) Date: Mar. 23, 2023

(87) PCT Pub. No.: WO2022/071309
PCT Pub. Date: Apr. 7, 2022

(65) Prior Publication Data
US 2023/0367170 A1    Nov. 16, 2023

(30) Foreign Application Priority Data

Sep. 30, 2020   (JP) .................................. 2020-164627

(51) Int. Cl.
*G02F 1/225*      (2006.01)
*G02F 1/21*       (2006.01)

(52) U.S. Cl.
CPC ............ *G02F 1/2255* (2013.01); *G02F 1/212* (2021.01)

(58) Field of Classification Search
CPC ........ G02F 1/035; G02F 1/212; G02F 1/2255; G02F 1/0316
See application file for complete search history.

(56) References Cited

U.S. PATENT DOCUMENTS 5,436,758 A * 7/1995 Agostinelli ........... G02F 1/3775
359/332

FOREIGN PATENT DOCUMENTS

| JP | H8-54657 A | 2/1996 | |
| JP | 2007-264548 A | 10/2007 | |
| JP | WO 2019224908 A1 * | 11/2019 | ............... G02B 6/13 |

(Continued)

OTHER PUBLICATIONS

Japanese Office Action dated Mar. 12, 2024 issued in corresponding Japanese application No. 2020-164627; English machine translation included (7 pages).

*Primary Examiner* — Michael P Mooney
(74) *Attorney, Agent, or Firm* — Rankin, Hill & Clark LLP

(57) ABSTRACT

An optical waveguide element includes: a substrate on which an optical waveguide is formed; and an electrode that is formed on the substrate and controls a light wave propagating through the optical waveguide. The optical waveguide includes a protruding portion extending on the substrate, and the electrode includes a base layer made of Nb, and an upper layer formed on the base layer, the base layer being formed between the substrate and the upper layer. The occurrence of loss in propagating light is effectively suppressed due to the existence of the electrode that controls the propagating light in the optical waveguide element using the protruding optical waveguide.

5 Claims, 7 Drawing Sheets

(56) References Cited

FOREIGN PATENT DOCUMENTS

WO 2018/031916 A1 2/2018
WO 2019/224908 A1 11/2019

* cited by examiner

CROSS-SECTIONAL ARROW
VIEW TAKEN ALONG LINE III-III

FIG. 5

| | SAMPLE 01 | SAMPLE 02 | SAMPLE 03 | SAMPLE 04 | SAMPLE 05 | SAMPLE 06 | SAMPLE 07 | SAMPLE 08 | SAMPLE 09 | SAMPLE 10 | SAMPLE 11 |
|---|---|---|---|---|---|---|---|---|---|---|---|
| BASE LAYER | NONE (Au SINGLE FILM) | Ti | Ti | Ti | Al | Al | Al | Nb | Nb | Nb | Nb |
| BASE LAYER THICKNESS | - | 1 | 5 | 10 | 10 | 20 | 100 | 1 | 5 | 10 | 20 |
| ADHESION RATE (%) | 0 | 100 | 100 | 100 | 97 | 97 | 36 | 100 | 100 | 100 | 100 |

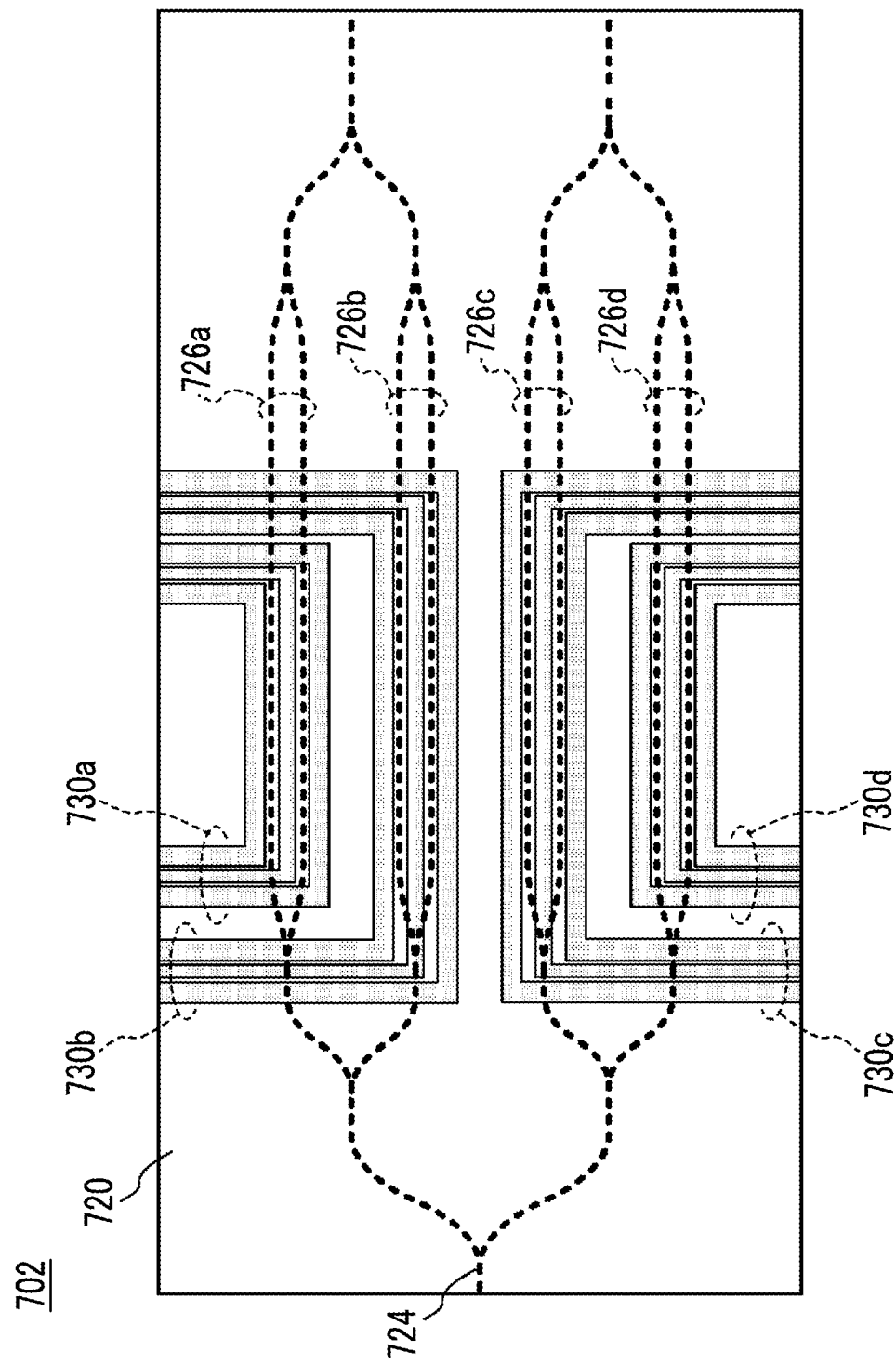

OPTICAL WAVEGUIDE ELEMENT AND OPTICAL MODULATOR

TECHNICAL FIELD

The present invention relates to an optical waveguide element, which is a functional element using an optical waveguide, and an optical modulator using an optical modulation element, which is an optical waveguide element.

BACKGROUND ART

In a high-speed/large-capacity optical fiber communication system, optical transmission apparatuses incorporating waveguide optical modulators are often used. Among them, an optical modulation element using $LiNbO_3$ (hereinafter also referred to as LN), which has an electro-optic effect, as a substrate, is widely used in the high-speed/large-capacity optical fiber communication system because it is possible to realize broadband optical modulation characteristics with less optical loss as compared with an optical modulation element using semiconductor materials, such as indium phosphide (InP), silicon (Si), or gallium arsenide (GaAs).

Meanwhile, in a modulation scheme in the optical fiber communication system, in response to the trend of increasing transmission capacity in recent years, multi-level modulation or a transmission format that incorporates polarization multiplexing into multi-level modulation, such as Quadrature Phase Shift Keying (QPSK) and Dual Polarization-Quadrature Phase Shift Keying (DP-QPSK), has become mainstream.

Acceleration in the spread of Internet services in recent years has led to a further increase in communication traffic, and studies are still underway to further reduce the size, broaden the bandwidth, and reduce the power consumption of the optical modulation element.

As one measure to reduce the size, broaden the bandwidth, and reduce the power consumption of such an optical modulation element, an optical modulator using a rib optical waveguide or a ridge optical waveguide (hereinafter collectively referred to as a protruding optical waveguide) that includes a band-shaped protruding portion formed on a front surface of an LN substrate (for example, a thickness of 20 μm or lower) thinned in order to enhance the interaction between the signal electric field and the guided light in the substrate (that is, in order to increase the electric field efficiency) is also being put to practical use (for example, Patent Literature Nos. 1 and 2).

At present, in order to further increase the electric field efficiency for the higher speed, studies are also underway to provide an electrode closer to the position of the protruding optical waveguide. Although Au (gold) is mainly used as the structure of the electrode, Au has low adhesiveness to the LN substrate, and a sufficient adhesion strength for practical use cannot be obtained. Therefore, in general, a Ti (titanium) film is formed as a base layer of the electrode so that the adhesion strength of the electrode to the substrate is ensured.

However, according to the findings of the inventor of the present invention, in a case where the conventional electrode having the above configuration is provided closer to the position of the rib optical waveguide, significant optical loss may occur in a light wave propagating through the protruding optical waveguide.

CITATION LIST

Patent Literature

[Patent Literature No. 1] Japanese Laid-open Patent Publication No. 2007-264548

[Patent Literature No. 2] PCT International Publication No. WO2018/031916

SUMMARY OF INVENTION

Technical Problem

From the above background, in the optical waveguide element using the protruding optical waveguide, such as a rib optical waveguide or a ridge optical waveguide, it is required to suppress the occurrence of loss in propagating light due to the electrode provided close to the protruding optical waveguide.

Solution to Problem

An aspect of the present invention is an optical waveguide element including: a substrate on which an optical waveguide is formed; and an electrode that is formed on the substrate and controls a light wave propagating through the optical waveguide, in which the optical waveguide includes a protruding portion extending on the substrate, and the electrode includes a base layer made of Nb, and an upper layer formed on the base layer, the base layer being formed between the substrate and the upper layer.

According to another aspect of the present invention, the base layer has a thickness of 30 nm or lower.

According to still another aspect of the present invention, the base layer is formed on the substrate containing an oxygen atom or formed on an oxide film formed on the substrate.

According to still another aspect of the present invention, the base layer contains an oxygen atom, and an element ratio Nb/O of Nb to oxygen is 1.0 or more.

According to still another aspect of the present invention, the electrode includes a plurality of electrodes disposed at positions interposing the optical waveguide and along the optical waveguide, on the substrate.

Still another aspect of the present invention is an optical modulator including: the optical waveguide element according to any of the above, which is an optical modulation element that modulates light; a housing that accommodates the optical waveguide element; an optical fiber through which light is input into the optical waveguide element; and an optical fiber that guides light output from the optical waveguide element to an outside of the housing.

This specification includes all the contents of Japanese Patent Application/Patent Application No. 2020-164627 filed on Sep. 30, 2020.

Advantageous Effects of Invention

According to the present invention, in the optical waveguide element using the protruding optical waveguide, such as a rib optical waveguide or a ridge optical waveguide, it is possible to effectively suppress the occurrence of loss in propagating light due to the electrode provided close to the protruding optical waveguide.

BRIEF DESCRIPTION OF DRAWINGS

FIG. 5 is a diagram showing an evaluation result of an adhesion strength of the electrode to a substrate in a case where various metals are used for the base layer of the electrode.

FIG. 7 is a diagram showing another example of the optical modulation element according to the present invention.

DESCRIPTION OF EMBODIMENTS

Hereinafter, an embodiment of the present invention will be described with reference to the drawings. An optical waveguide element according to the embodiment described below is an optical modulation element including an LN substrate, but the optical waveguide element according to the present invention is not limited to this. The present invention can be similarly applied to an optical waveguide element using a substrate other than the LN substrate or an optical waveguide element having a function other than optical modulation.

Figure 1:
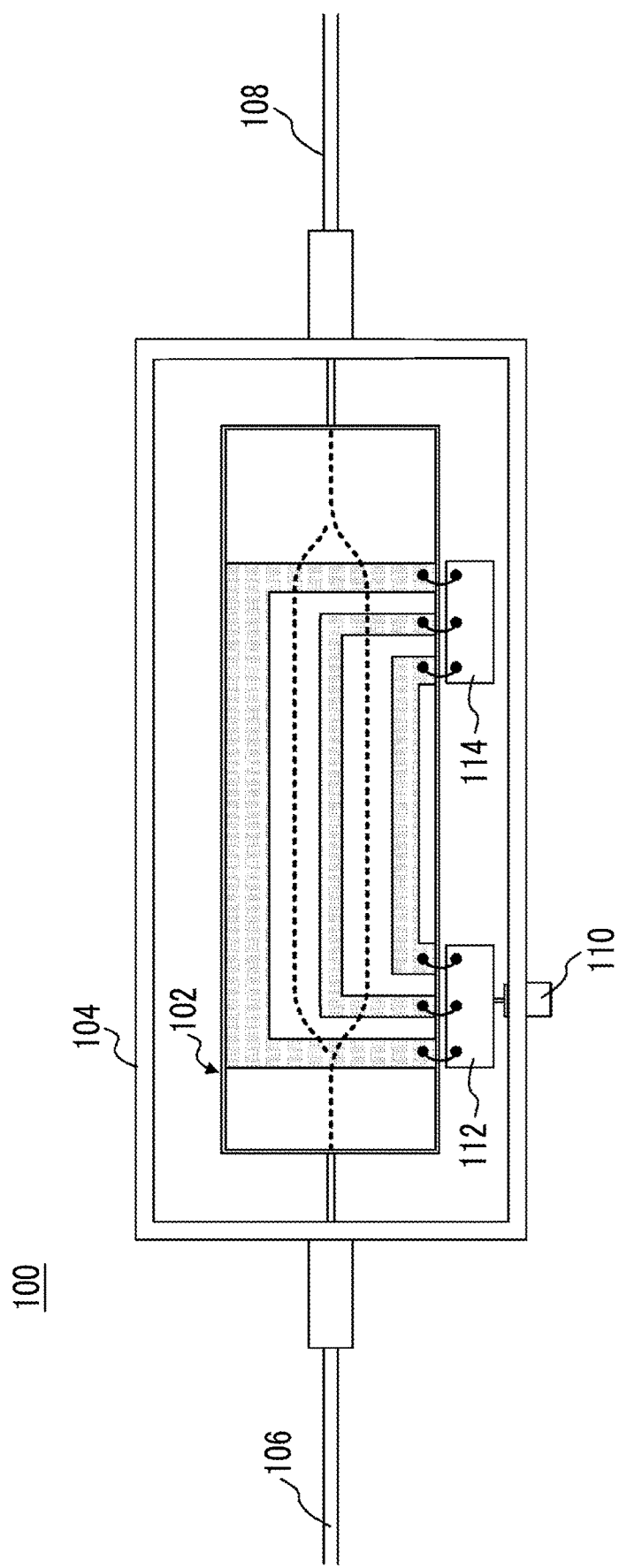
FIG. 1 is a diagram showing a configuration of an optical modulator according to one embodiment of the present invention.

FIG. 1 is a diagram showing the configuration of an optical modulation element, which is an optical waveguide element according to one embodiment of the present invention, and an optical modulator. In the present embodiment, the optical waveguide element is an optical modulation element 102 that performs optical modulation using a Mach-Zehnder optical waveguide.

An optical modulator 100 accommodates the optical modulation element 102 inside a housing 104. The inside of the housing 104 is finally hermetically sealed with a plate-shaped cover (not shown) fixed to an opening portion of the housing 104.

The optical modulator 100 includes an input optical fiber 106 for inputting light into the housing 104 and an output optical fiber 108 that guides light modulated by the optical modulation element 102 to the outside of the housing 104.

The optical modulator 100 also includes a connector 110 for receiving a high-frequency electrical signal for causing the optical modulation element 102 to perform an optical modulation operation from the outside, and a relay substrate 112 for relaying the high-frequency electrical signal received by the connector 110 to one edge of the electrode (for example, a signal electrode) of the optical modulation element 102. In addition, the optical modulator 100 includes a terminator 114 having a predetermined impedance and connected to an other edge of the electrode of the optical modulation element 102. Here, the electrode of the optical modulation element 102, and the relay substrate 112 and the terminator 114 are electrically connected by bonding, for example, a metal wire or the like.

Figure 2:
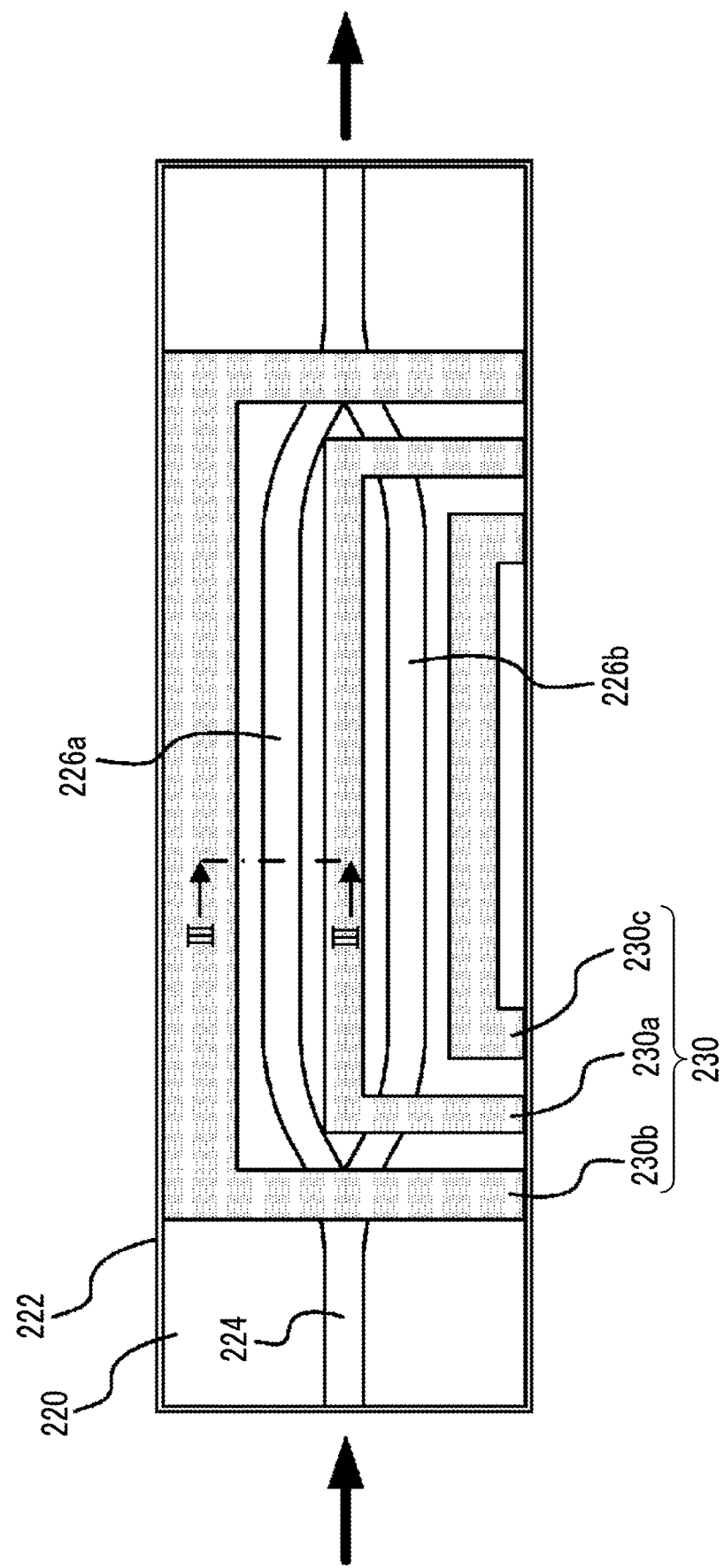
FIG. 2 is a diagram showing a configuration of an optical modulation element used in the optical modulator shown in FIG. 1.

FIG. 2 is a diagram showing the configuration of the optical modulation element 102, which is an optical waveguide element accommodated in the housing 104 of the optical modulator 100 shown in FIG. 1. The optical modulation element 102 includes an optical waveguide 224 formed on a substrate 220. The substrate 220 is, for example, an X-cut LN substrate that has an electro-optic effect and that is thinned by being processed to a thickness of 20 μm or lower (for example, 2 μm).

The optical waveguide is a protruding optical waveguide (for example, a rib optical waveguide or a ridge optical waveguide) that includes a protruding portion extending in a band shape and formed on a front surface of the thinned substrate 220. Here, the LN substrate is generally adhered to a supporting plate 222, such as glass, via an adhesive layer 350 (which will be described later) in order to enhance the mechanical strength of the entire substrate because the refractive index may locally change due to the photo-elastic effect when stress is applied.

The optical waveguide 224 is, for example, a Mach-Zehnder optical waveguide, and includes two branched portions and two parallel waveguides 226a and 226b extending parallel to each other. Electrodes 230a, 230b, and 230c that change the refractive index of the parallel waveguides 226a and 226b to control light waves propagating through the parallel waveguides 226a and 226b are also provided on the substrate 220. Hereinafter, the electrodes 230a, 230b, and 230c are also collectively referred to as an electrode 230.

The electrode 230 constitutes, for example, a coplanar transmission line having a predetermined impedance, as in the conventional art. Specifically, the electrode 230a is a center electrode, and is formed at a position interposed between the parallel waveguides 226a and 226b and along these parallel waveguides in the in-plane of the substrate 220. Further, the electrodes 230b and 230c are ground electrodes, and are formed at positions facing the electrode 230a with the parallel waveguide 226a and the parallel waveguide 226b interposed between the electrodes 230b and 230c and along these parallel waveguides, respectively.

The electrode 230 is terminated at the edge of the substrate 220 on the lower right in the drawing with the terminator 114, whereby the high-frequency signal input from the edge of the substrate 220 on the lower left in the drawing via the connector 110 propagates from the left to the right in the drawing as a traveling wave. With this, the electrode 230 constitutes signal lines for controlling light waves propagating through the parallel waveguides 226a and 226b from the left to the right in the drawing.

Figure 3:
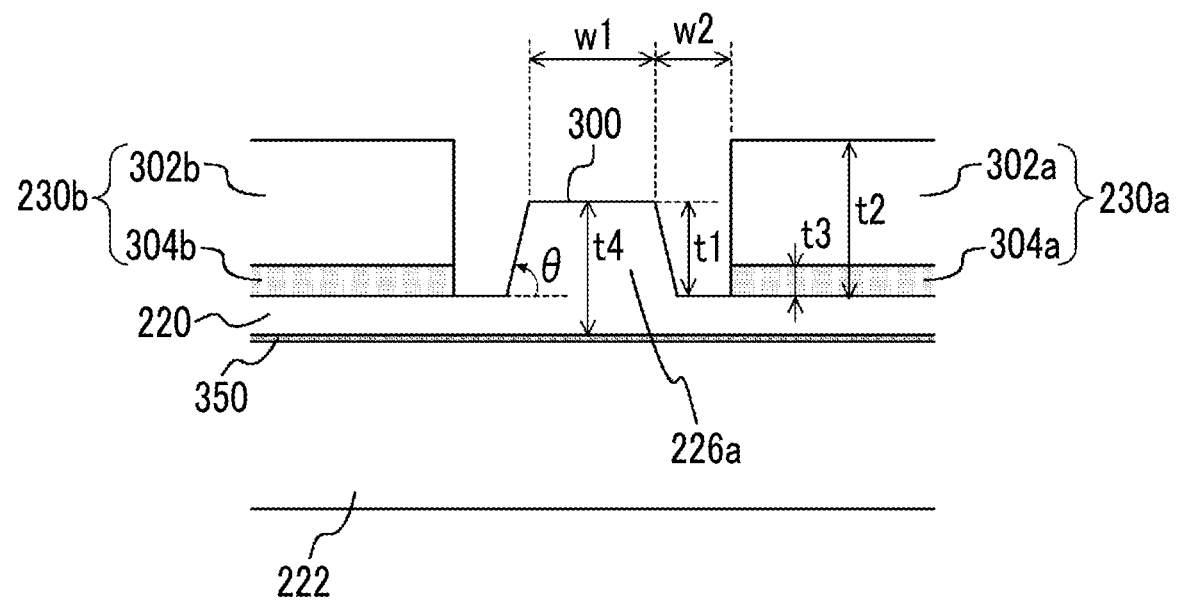
FIG. 3 is a cross-sectional arrow view taken along line III-III of the optical modulation element shown in FIG. 2.

FIG. 3 is a cross-sectional arrow view taken along line III-III of the optical modulation element 102 shown in FIG. 2. The substrate 220 is adhered to the supporting plate 222, which is, for example, glass, via the adhesive layer 350. The parallel waveguide 226a, which is a protruding optical waveguide, includes a protruding portion 300 formed on the substrate 220. A height t1 of the protruding portion 300 measured from a surface of the substrate 220 is 10 μm or lower (for example, 1 μm).

The electrodes 230a and 230b are disposed on the substrate 220 with the parallel waveguide 226a interposed between the electrodes 230a and 230b. The electrodes 230a and 230b are each formed on the substrate 220 with a height t2. The height t2 is set such that the electrode 230 has a predetermined impedance and the traveling wave of the high-frequency electrical signal propagating through the electrode 230 propagates at a predetermined velocity and loss within a predetermined range.

A gap w2 between any electrode (the electrode 230a in the present embodiment) closer to the parallel waveguide 226a, out of the electrodes 230a and 230b, and the parallel waveguide 226a is, for example, 0.5 times or higher and 2 times or lower of w1 (that is, $0.5w1 \leq w2 \leq 2w1$). Of course, in a case where the electrodes 230a and 230b are formed symmetrically about the parallel waveguide 226a, the gaps between the electrode 230a and the parallel waveguide 226a and between the electrode 230b and the parallel waveguide 226a are the same gap w2.

The electrodes 230a and 230b have the same configuration as each other, and include upper layers 302a and 302b and base layers 304a and 304b, respectively. Here, although the electrode 230c is not shown in FIG. 3, it should be understood that the electrode 230c also includes an upper layer and a base layer as in the electrodes 230a and 230b.

Hereinafter, the upper layers 302a and 302b and the upper layer (not shown) of the electrode 230c are collectively referred to as an upper layer 302, and the base layers 304a and 304b and the base layer (not shown) of the electrode 230c are collectively referred to as a base layer 304. That is, the electrode 230 includes the upper layer 302 and the base layer 304.

The upper layer 302 is made of, for example, gold (Au) as in the conventional art. The Au contained in the upper layer 302 is formed on the substrate 220 via the base layer 304 because the Au does not have a sufficient adhesion strength for practical use to the substrate 220 in a case where the Au is formed directly on the substrate 220.

Conventionally, the base layer provided in order to ensure the adhesion strength to the substrate generally contains titanium (Ti). The inventor of the present invention has found that, in a case where the electrode is provided in the vicinity of the protruding optical waveguide, loss (optical absorption loss) in propagating light of the protruding optical waveguide occurs because the light propagating through the protruding optical waveguide is absorbed by the metal contained in the base layer of the electrode.

The inventor of the present invention has obtained findings in which the causes of such optical absorption loss are because the operating optical wavelength of the optical modulation element (for example, an optical wavelength of 1.55 μm and/or 1.3 μm used for optical communication) exists in a light absorption range in the optical absorption spectrum of the metal of the base layer, and because apart of the mode field of the propagating light propagating through the protruding optical waveguide spreads to the substrate part in the vicinity of the protruding waveguide.

The optical absorption loss may also increase as the thickness of the base layer increases. Therefore, it is necessary that the base layer is made of a metal which has a good adhesion strength and of which the light absorption range does not include the operating optical wavelength, and that the base layer is formed in a thickness in which the optical absorption loss can be suppressed to a certain level or lower.

The inventor of the present invention has made repeated studies on the material and the thickness of the base layer, and has obtained findings in which it is effective to use niobium (Nb) instead of Ti, which has been conventionally used as a metal for the base layer, as a solution for suppressing the above-described optical absorption loss while maintaining the adhesion strength to the substrate at a level for practical use.

According to the above findings, in the present embodiment, particularly, the base layer 304 is made of Nb with a film thickness t3. Formation of the base layer and the upper layer on the substrate 220 can be performed, for example, by electron beam vapor deposition (EB vapor deposition).

Figure 4:
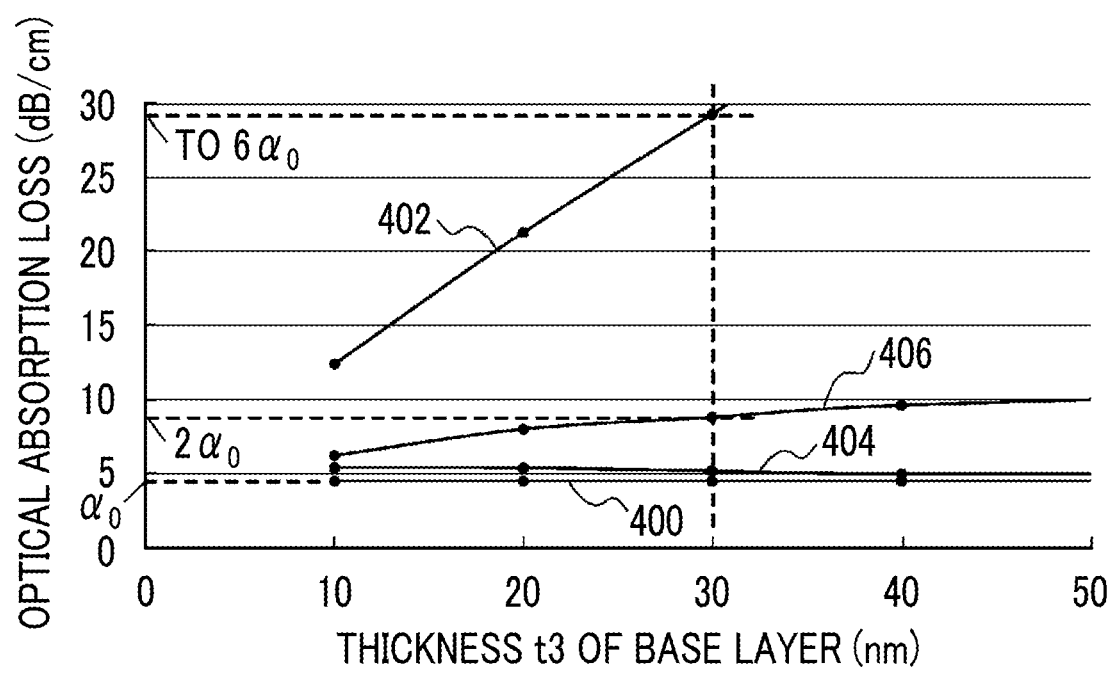
FIG. 4 is a diagram showing a simulation result of optical absorption loss in a case where various metals are used for a base layer of an electrode.

FIG. 4 shows a part of simulation results of the amount of increase of the optical absorption loss with respect to the thickness of the base layer 304 in a case where various metals are used as the base layer 304. FIG. 4 shows calculation results in a case where Ti, Al (aluminum), and Nb are used as the base layer 304 in addition to a case where the base layer 304 is not used (in a case of an Au (upper layer 302) single film). In FIG. 4, the horizontal axis is the thickness t3 of the base layer 304, and the vertical axis is the amount of optical absorption loss when light propagates through a unit length (1 cm) of the parallel waveguide 226a. The model used for the simulation has the same configuration as shown in FIG. 3, and is assumed to have w1=0.9 μm, w2=0.55 μm, t1=0.4 μm, t2=1.0 μm, t4=0.6 μm, and θ=65° and to use Au as the upper layer 302 and 1.55 μm as the operating optical wavelength. Here, t4 is the height of the protruding portion 300 measured from a back surface of the substrate 220, and θ is a rising angle of a side surface of the protruding portion 300 with respect to the surface of the substrate 220. Further, in calculating the optical absorption loss, the optical absorption amount of each metal at the operating wavelength of 1.55 μm obtained from the optical absorption spectra of Ti, Al, and Nb was used.

Optical absorption loss $\alpha_0$ in the case of an Au single film (no base layer exists) indicated by a line 400 is the optical absorption loss as the background in the above configuration, and the optical absorption loss in the base layer 304 can be evaluated using the increase in the optical absorption loss from this reference line.

Lines 402, 404, and 406 indicate the optical absorption loss in a case where the metal contained in the base layer 304 is Ti, Al, and Nb, respectively. Among these metals, Ti indicated by the line 402 has the largest optical absorption loss, and the optical absorption loss increases greatly in proportion to the film thickness.

Meanwhile, it can be seen that, from the lines 404 and 406 indicating a case where Al and Nb of which the light absorption ranges do not include the operating wavelength are used as the base layer 304, the optical absorption loss is greatly reduced as compared with the case of Ti (line 402). In the range of evaluation results shown in FIG. 4, in a case where the base layer 304 is Al (line 404), the optical absorption loss is the smallest, and the optical absorption loss is substantially constant with respect to the thickness of the base layer. However, Al is generally known to have a low adhesion strength to the substrate.

FIG. 5 is a table showing results of evaluation of the adhesion strength of the electrode to the LN substrate in a case where various metals are used as the base layer. In this evaluation, Au with a thickness of 100 nm was used as the upper layer. The evaluation of the adhesion strength conformed to Japanese Industrial Standards JIS K 5600-5-6: 1999. That is, after forming an electrode layer on the entire substrate surface of the LN substrate, the electrode was cut using a cutter to form a rectangular sample of the same size of 10×10 (100 in total) on the LN substrate plane. Next, an adhesive tape with adhesiveness designated by the above standard was attached to the above 100 samples, and the adhesion strength was evaluated using the number of samples remaining on the LN substrate when the tape was peeled off from the LN substrate. The base layer and the upper layer were formed on the LN substrate using EB vapor deposition.

A sample 01 shown in FIG. 5 is a sample of an Au single film (no base layer, only the upper layer), and the adhesion rate is 0%. Samples 02 to 04 are samples using conventional Ti as the base layer, and the adhesion rate is 100% in a case where the thickness of the base layer is 1 μm or higher. On the other hand, in samples 05 to 07 using Al as the base layer, the adhesion rate is below 100% at any thickness, and an adhesion strength of a level at which it can withstand practical use cannot be obtained.

Meanwhile, in samples 08 to 11 using Nb as the base layer, the adhesion rate is 100% at a thickness of 1 µm or higher, and it can be seen that a sufficient adhesion strength for practical use can be obtained.

Figure 6:
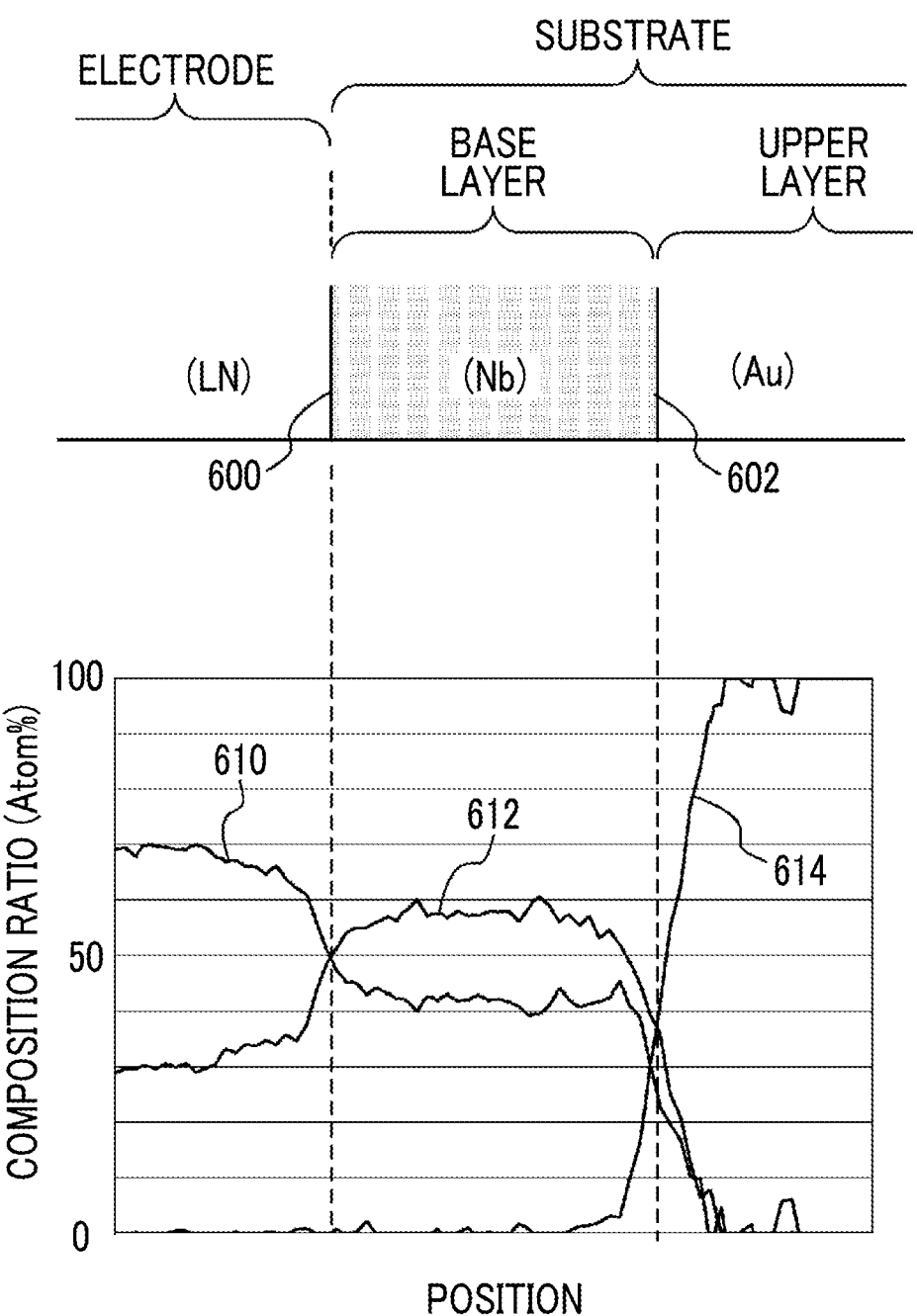
FIG. 6 is a diagram showing a result of composition analysis in a cross-section of an electrode constituent part in a case where the electrode including an Nb base layer is formed on the substrate.

FIG. 6 shows the results of cross-sectional composition analysis of a portion where these electrodes are formed in a sample in which an Nb base layer and an Au upper layer are formed on the LN substrate. As in the evaluation in FIG. 5, the base layer and the upper layer are formed using EB vapor deposition. The horizontal axis of FIG. 6 is the position, and the vertical axis is the composition ratio (atomic percent). In addition, in FIG. 6, lines 610, 612, and 614 indicate positional changes in the composition ratios of oxygen, Nb, and Au, respectively.

In FIG. 6, in the vicinity of an interface 600 between the LN substrate and the base layer, oxygen in the LN substrate decreases, and oxygen exists in addition to Nb in the base layer. Meanwhile, at an interface 602 between the base layer and the upper layer, Au exists in the base layer and Nb exists in the upper layer. From this, it is considered that the adhesion force between the LN substrate and the Nb base layer is due to the bonding between LN and Nb via oxygen, and the adhesion force between the Nb base layer and the Au upper layer is due to the bonding through alloying between Nb and Au.

In FIG. 6, an element ratio Nb/O of Nb to oxygen in the Nb base layer is 1.2. Considering that Nb oxide can take various forms such as NbO and $NbO_2$, it is considered that the element ratio Nb/O in the Nb base layer need only be substantially 1.0 or more and is preferably 1.2 or more.

It is considered that oxygen existing in the vicinity of the interface 602 in the Nb base layer is due to the permeation of oxygen from the LN substrate or due to the permeation of oxygen existing in the environmental atmosphere into the base layer.

Referring to FIG. 3, according to the present embodiment, the base layer 304 is made of Nb, and the element ratio of Nb to oxygen in the base layer 304 is 1.2.

Further, from the lines 406 and 400 in FIG. 4, it is desirable that the thickness of the base layer made of Nb is 30 nm or lower. In a case where the thickness of the Nb base layer is within this range, the optical absorption loss can be suppressed to a value equal to or lower than $2\alpha_0$, which is twice the value $\alpha_0$ of the Au single film, or to a value equal to or lower than ⅓ of the value of about $6\alpha_0$, which is the value in the case of the base layer using conventional Ti. In the present embodiment, w2=2.0 µm, and the thickness t3 of the base layer 304 made of Nb is, for example, 10 nm. In this case, the optical absorption loss in the parallel waveguide 226a is 6.0 dB/cm.

In the optical modulation element 102 having the above configuration, since the base layer of the electrode 230 that controls the light wave of the parallel waveguide 226a, which is a protruding optical waveguide, is made of Nb, it is possible to effectively suppress the optical absorption loss in the parallel waveguide 226a to ⅓ or lower as compared with the optical waveguide element using conventional Ti as the base layer, while maintaining the adhesion strength of the electrode 230 to the substrate 220 at a level at which it can withstand practical use.

It should be noted that the present invention is not limited to the configurations of the above embodiment and modification examples, and can be implemented in various aspects without departing from the gist of the present invention.

For example, in the above-described embodiment, the substrate 220 is the LN substrate, but the material of the substrate 220 is not limited to LN. The substrate 220 on which the base layer 304 made of Nb is formed may be made of a material containing oxygen in the composition of the material, such as lithium tantalate ($LiTaO_3$). Alternatively, in a case where the base layer 304 is formed on an oxide coat formed on the substrate 220, for example, on a buffer layer made of $SiO_2$, the substrate 220 may be a semiconductor, such as InP, or a Si substrate used in a so-called silicon photonics device.

Further, in the above-described embodiment, the base layer 304 and the upper layer 302 of the electrode 230 are formed by EB vapor deposition, but the means for forming the electrode 230 is not limited to the EB vapor deposition. For example, the base layer 304 and the upper layer 302 of the electrode 230 may be formed by a vapor deposition method other than EB vapor deposition, a sputtering method, or the like.

Further, in the present embodiment, an optical modulation element in which an optical modulation operation is performed by the optical waveguide 224 that constitutes a single Mach-Zehnder optical waveguide including a pair of parallel waveguides 226a and 226b has been described as the optical modulation element 102, but the configuration of the electrode described as an example of the electrode 230 is not limited to the optical modulation element including the single Mach-Zehnder optical waveguide. The same electrode having the base layer 304 as the above-described electrode 230 shown in FIG. 3 can be similarly used in an optical modulation element 702 that performs DP-QPSK modulation and that includes, for example, two so-called nested Mach-Zehnder optical waveguides as shown in FIG. 7. In such an optical modulation element that performs DP-QPSK modulation, while it is required to further reduce the size, broaden the bandwidth, and reduce the power consumption, the problem of optical absorption loss becomes more conspicuous because the gap between the waveguide and the electrode is further narrowed due to the limitation on the installation area of the parallel waveguides or the electrodes on the substrate 720.

In the optical modulation element 702, for example, electrodes 730a, 730b, 730c, and 730d that extend along respective parallel waveguides 726a, 726b, 726c, and 726d (broken lines in the drawing), which are protruding optical waveguides formed on the substrate 720 as in the substrate 220, can be formed by the upper layer 302 and the base layer 304 as in the electrode 230 shown in FIG. 3. With this, even in such an optical modulation element that performs DP-QPSK modulation, optical absorption loss in the parallel waveguide 726a or the like can be reduced, and good modulation characteristics can be obtained.

As described above, the optical modulation element 102, which is an optical waveguide element described in the present embodiment, includes the substrate 220 on which the optical waveguide 224 is formed, and the electrode 230 that is formed on the substrate 220 and that controls the light wave propagating through the optical waveguide 224. Here, the optical waveguide 224 includes a protruding portion (for example, the protruding portion 300) extending on the substrate 220. The electrode 230 includes the base layer 304 formed between the substrate 220 and the upper layer 302 and made of Nb, and the upper layer 302 formed on the base layer 304.

According to this configuration, by using Nb as the base layer of the electrode 230, the optical absorption loss caused by the existence of the electrode 230 can be effectively reduced in the optical waveguide 224 (for example, the parallel waveguide 226a) which is a protruding optical waveguide.

Further, the base layer 304 has a thickness of 30 nm or lower. According to this configuration, the optical absorption loss that occurs in the optical waveguide 224 because of the existence of the electrode 230 can be reduced to ⅓ as compared with the configuration using conventional Ti as the base layer.

Further, the base layer 304 is formed on the substrate 220 containing an oxygen atom or formed on an oxide film formed on the substrate 220. According to this configuration, it is possible to ensure an adhesion force of a level at which it can withstand practical use between the base layer 304 made of Nb and the substrate made of LN or the like.

Further, the base layer 304 contains an oxygen atom, and the element ratio Nb/O of Nb to oxygen is 1.0 or more. According to this configuration, it is possible to more reliably ensure an adhesion force of a level at which it can withstand practical use between the base layer 304 made of Nb and the substrate made of LN or the like.

Further, the electrode 230 includes a plurality of (for example, two) electrodes 230a and 230b that are disposed, for example, at positions interposing the parallel waveguide 226a, which constitutes the optical waveguide 224, and along the parallel waveguide 226a, on the substrate 220. According to this configuration, it is possible to effectively suppress the occurrence of optical absorption loss in the propagating light of the parallel waveguide 226a due to the electrodes disposed close to the parallel waveguide 226a with the parallel waveguide 226a interposed between the electrodes.

Further, the optical modulator 100 can be formed by the optical modulation element 102, which is the optical waveguide element, the housing 104 that accommodates the optical modulation element 102, the input optical fiber 106 through which light is input into the optical modulation element 102, and the output optical fiber 108 that guides light output from the optical modulation element 102 to the outside of the housing 104. The optical modulator 100 formed in this manner can realize good optical modulation characteristics and optical transmission characteristics because the optical modulation element 102 in which optical absorption loss in the protruding optical waveguide (for example, the parallel waveguide 226a), which may occur due to the existence of the electrode 230, is suppressed is used.

REFERENCE SIGNS LIST

100: optical modulator
102, 702: optical modulation element
104: housing
106: input optical fiber
108: output optical fiber
110: connector
112: relay substrate
114: terminator
220, 720: substrate
222: supporting plate
224, 724: optical waveguide
226a, 226b, 726a, 726b, 726c, 726d: parallel waveguide
230, 230a, 230b, 230c, 730a, 730b, 730c, 730d: electrode
300: protruding portion
302, 302a, 302b: upper layer
304, 304a, 304b: base layer
350: adhesive layer
600, 602: interface

The invention claimed is:

1. An optical waveguide element comprising:
a substrate on which an optical waveguide is formed; and
an electrode that is formed on the substrate and controls a light wave propagating through the optical waveguide,
wherein
the optical waveguide includes a protruding portion extending on the substrate,
the electrode includes a base layer made of Nb, and an upper layer formed on the base layer, the base layer being formed between the substrate and the upper layer, and
the base layer contains an oxygen atom, and an element ratio Nb/O of Nb to oxygen is 1.0 or more.

2. The optical waveguide element according to claim 1, wherein the base layer has a thickness of 30 nm or lower.

3. The optical waveguide element according to claim 1, wherein the base layer is formed on the substrate containing an oxygen atom or formed on an oxide film formed on the substrate.

4. The optical waveguide element according to claim 1, wherein the electrode includes a plurality of electrodes disposed at positions interposing the optical waveguide and along the optical waveguide, on the substrate.

5. An optical modulator comprising:
the optical waveguide element according to claim 1, which is an optical modulation element that modulates light;
a housing that accommodates the optical waveguide element;
an optical fiber through which light is input into the optical waveguide element; and
an optical fiber that guides light output from the optical waveguide element to an outside of the housing.

* * * * *